(12) United States Patent
Meier et al.

(10) Patent No.: US 12,033,058 B1
(45) Date of Patent: Jul. 9, 2024

(54) ITERATIVE NEURAL NETWORK TRAINING USING QUALITY ASSURANCE NEURAL NETWORK

(71) Applicant: Apple Inc., Cupertino, CA (US)

(72) Inventors: Peter Meier, Los Gatos, CA (US); Tanmay Batra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1118 days.

(21) Appl. No.: 16/421,606

(22) Filed: May 24, 2019

Related U.S. Application Data

(60) Provisional application No. 62/676,027, filed on May 24, 2018.

(51) Int. Cl.
  *G06N 3/045* (2023.01)
  *G06F 18/2115* (2023.01)
  *G06F 18/214* (2023.01)
  *G06N 3/082* (2023.01)

(52) U.S. Cl.
  CPC ......... *G06N 3/045* (2023.01); *G06F 18/2115* (2023.01); *G06F 18/2148* (2023.01); *G06N 3/082* (2013.01)

(58) Field of Classification Search
  CPC .................................................. G06N 3/0454
  See application file for complete search history.

(56) References Cited

U.S. PATENT DOCUMENTS

| | | | |
|---|---|---|---|
| 9,922,285 B1* | 3/2018 | Glode | G06N 3/08 |
| 2016/0148080 A1* | 5/2016 | Yoo | G06N 3/0454 382/118 |
| 2016/0253597 A1* | 9/2016 | Bhatt | G06N 20/00 706/12 |
| 2016/0307071 A1 | 10/2016 | Perronnin et al. | |
| 2018/0307950 A1* | 10/2018 | Nealis | G06F 9/3001 |

(Continued)

OTHER PUBLICATIONS

Lee, "Pseudo-Label : The Simple and Efficient Semi-Supervised Learning Method for Deep Neural Networks", 2013, In Workshop on challenges in representation learning, ICML, 6 pages (Year: 2013).*

(Continued)

*Primary Examiner* — Marc S Somers
*Assistant Examiner* — Asher H. Jablon
(74) *Attorney, Agent, or Firm* — Thompson Hine LLP

(57) ABSTRACT

In some implementations initially training a first neural network includes inputting the training inputs and corresponding training labels into the first neural network to produce output labels, comparing the output labels to the corresponding training labels using a second neural network that learns and applies a comparison metric, and adjusting parameters of the first neural network based on the comparing. The device then inputs additional inputs into the first neural network to produce additional output labels and corresponding confidence values from the second neural network. The device selects, based on the confidence values, an automatically-labeled training set of data including a subset of the additional inputs and a corresponding subset of the additional output labels. During a second training stage, the device trains the first neural network and the second neural network using the automatically-labeled training set of data.

18 Claims, 8 Drawing Sheets

(56) References Cited

U.S. PATENT DOCUMENTS

2019/0179949 A1* 6/2019 Gerstl .................. G06F 16/282
2019/0258878 A1* 8/2019 Koivisto .............. G06V 10/762

OTHER PUBLICATIONS

Santos et al., "Learning Loss Functions for Semi-supervised Learning via Discriminative Adversarial Networks", 2017, In 31st Conference on Neural Information Processing Systems (NIPS 2017), 9 pages (Year: 2017).*
Fan et al., "Learning to Teach", May 9, 2018, arXiv preprint arXiv:1805.03643v1, 16 pages (Year: 2018).*
Mirzaet al., "Conditional Generative Adversarial Nets", 2014, arXiv:1411.1784v1 [cs.LG], 7 pages (Year: 2014).*
Wendel, Alexander and Underwood, James, "Self-Supervised Weed Detection in Vegetable Crops Using Ground Based Hyperspectral Imaging"; 2016 IEEE International Conference on Robotics and Automation (ICRA); Stockholm Sweden, May 16-21, 2016; pp. 5128-5135.
Schwenker, Friedhelm and Trentin, Edmondo; "Pattern Classification and Clustering: A review of partially supervised learning approaches"; Pattern Recognition Letters; vol. 37, Feb. 1, 2014; pp. 1-12.

* cited by examiner

ITERATIVE NEURAL NETWORK TRAINING USING QUALITY ASSURANCE NEURAL NETWORK

CROSS-REFERENCE TO RELATED APPLICATION

This application claims the benefit of U.S. Provisional Application Ser. No. 62/676,027 filed May 24, 2018, which is incorporated herein in its entirety.

TECHNICAL FIELD

The present disclosure generally relates to neural network training, and in particular, to systems, methods, and devices for semi-supervised neural network learning using quality assurance neural networks.

BACKGROUND

Neural networks can be trained for various operations including, but not limited to, prediction, forecasting, classification, pattern recognition, or general reinforcement learning. Neural networks can be trained using semi-supervised learning. One example of semi-supervised learning is the "bootstrapping" method that starts with a small number of labeled examples, trains initial models using those examples, and then uses the initial models to label unlabeled data. The model is then re-trained using the confident self-labeled examples in addition to the original labeled examples. Semi-supervised learning falls between unsupervised learning (e.g., without any labeled training data) and supervised learning (e.g., with completely labeled training data).

Semi-supervised learning for neural networks can be unsatisfactory for at least the reason that accurate loss functions are very difficult to identify. Further, the small number of labeled examples makes is extremely difficult to train neural networks with conventional cost functions. In order to train neural networks with such small number of labeled examples, additional constraints on the neural networks are needed.

SUMMARY

Various implementations disclosed herein include devices, systems, and methods that use neural networks for general reinforcement learning including without limitation: data or image annotation, hand tracking, body tracking, semantic segmentation, dense depth estimation, classification, gaze tracking, etc.

One example implementation involves performing operations at a device with one or more processors and a tangible computer-readable storage medium. In some implementations initially training the first neural network includes inputting the training inputs and corresponding training labels into the first neural network to produce output labels, comparing the output labels to the corresponding training labels using a second neural network that learns and applies a comparison metric, and adjusting parameters of the first neural network based on the comparing. The device then inputs additional inputs into the first neural network to produce additional output labels and corresponding confidence values produced by the second neural network. The device selects, based on the confidence values, an automatically-labeled training set of data including a subset of the additional inputs and a corresponding subset of the additional output labels. During a second or unsupervised training stage, the device trains the first neural network using the automatically-labeled training set of data.

Various implementations configure a second neural network to significantly improve performance of the above-described bootstrapping training approach for a first neural network. The second neural network can be a quality assurance neural network or a plurality of quality assurance neural networks. In some implementations, the second neural network is trained to learn and use one or more metrics for use in the comparisons applied in training the first neural network.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
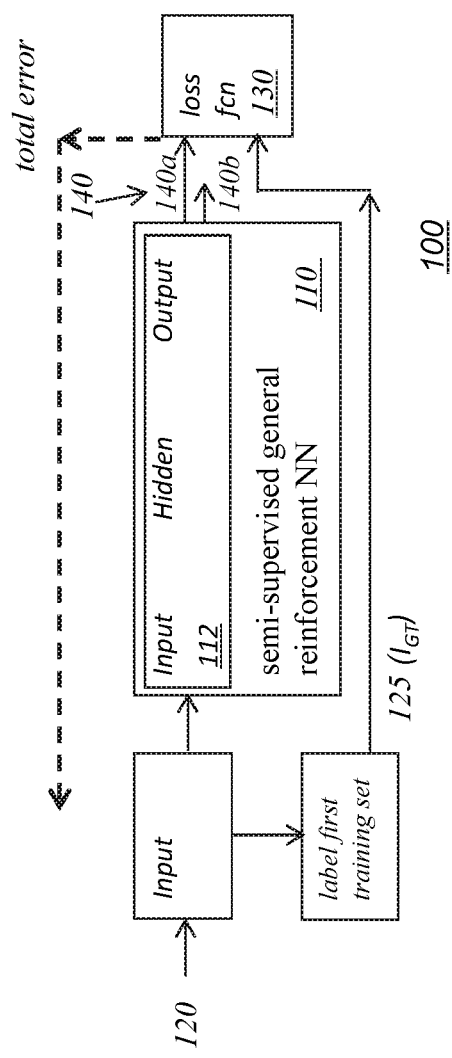
FIG. 1 is a block diagram of an example semi-supervised model environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a diagram that shows a first portion of semi-supervised learning for an example neural network (NN). As shown in FIG. 1, NNs can be trained using semi-supervised learning. Initially, an operation or task of a first NN 110 is identified. Operations of the first NN 110 can include, but are not limited to, prediction, forecasting, classification, pattern recognition, general reinforcement learning, or the like.

In various implementations, NNs have an input layer, one or more hidden (or inner) layers, and an output layer. Each layer comprises one or more nodes. A weight is a variable that sits on an edge between nodes or otherwise connects nodes. Weights 112 can include weights between the input layer and a hidden layer, weights between more than one hidden layer, and weights between the last hidden layer and the output layer.

In a supervised training stage of semi-supervised learning, first, weights 112 of the NN 110 are initialized. Second, a small number of first example inputs or first training inputs 120 are human labeled for the identified NN task to become first labeled training outputs 125 (e.g., ground truth labeled outputs ($I_{GT}$), and a human identified loss function 130 (e.g., error function) is determined for the identified NN task. For example, if the NN task is human pose estimation, human shapes or skeletons can be labeled in each of the first training images 120, and a loss function 130 could be a distance between joints or relationship of labeled/identified joints in a skeleton. Third, the NN 110 undergoes supervised training using gradient descent based on the first training images 120, the $I_{GT}$ outputs 125, and the human identified loss function 130. In other words, the NN 110 undergoes supervised training by passing first training inputs 120 through the NN 110 to modify the weights 112 to minimize the difference between the actual NN 110 output 140 and the target output 125 (e.g., $I_{GT}$). Training the NN 100 means minimizing the difference between the actual output and the target output. This difference between the actual output and the target output for each item input to the NN 110 is the total error of the NN 110 and is set by the loss function 130. In other words, the loss function 130=the output 140–labels/targets of target output 125 (e.g., $I_{GT}$). As shown in FIG. 1, each output 140 of the NN 100 will include a NN 110 labeled output 140a (e.g., image) and a confidence value 140b (e.g., representative of total error for that corresponding output).

In various implementations, gradient descent for NN training includes full batch training, stochastic training or mini-batch training. Full batch training sums the gradients for all elements of the training set and then updates the weights 112 of the NN 110 (e.g., 1 update of the weights 112). Stochastic training updates the weights 112 of the NN 110 after each individual element of the training set, and mini-batch training sums the gradients for multiple training elements (but not all) of the training set and then updates the weights 112 of the NN 110.

For example, the labeled images $I_{GT}$ 125 can include 20 labeled images as ground truth data. In one implementation, the supervised training of FIG. 1 divides the first training inputs 120, into 4 groups and mini-batch training is used to update the weights 112 of the NN 110 four times to complete the supervised training stage of semi-supervised learning. Thus, after images 1-5 of the first training inputs 120 are passed through the NN 110, the loss function 130 sums the gradients then updates the weights 112 of the NN 110 working backward from the output layer weights, through the hidden layer weights (e.g., inner layer weights) to the input layer weights to minimize the difference (defined by the loss function 130) between the actual output 140 and the actual labeled images 1-5 of the target output 125 (e.g., $I_{GT}$). Then, images 6-10 of the first training inputs 120 are passed through the NN 110 having weights updated by gradient descent according to images 1-5 of the first training inputs 120. This process repeats until all of the first training inputs 120 are passed through the NN 110 for comparison to the target output of the first labeled training outputs 125 in supervised training. As shown in FIG. 1, gradient descent uses gradient back propagation to adjust the weights 112 to reduce total error determined by the loss function 130.

Figure 2:
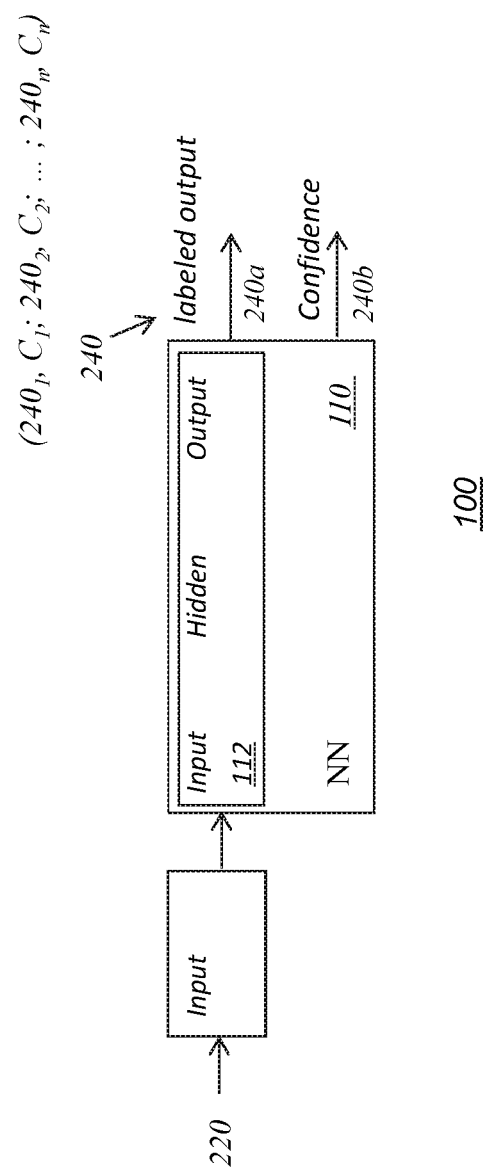
FIG. 2 is a block diagram of an example semi-supervised model environment.

FIG. 2 is a diagram that shows a second portion of semi-supervised learning for an example NN. As shown in FIG. 2, a set of real-world inputs 220 (e.g., a million or a billion unlabeled images) are input into the supervised trained NN 110 and for each real world input (e.g., image $220_1$, image $220_2$, . . . image $220n$), a corresponding labeled output 240a (e.g., image $240_1$, image $240_2$, . . . image $240n$), is output along with its confidence value 240b. When the entire set of real-world inputs 220 are passed through the NN 110, a subset (e.g., 10, 20, 100, or 1000 labeled images $240_i$ of the labeled output 240 become an automatically-labeled or second training set of inputs 320. Each of the second training inputs 320 will include its corresponding unlabeled training input 320 and a second labeled training output 325. (e.g., a subset of the output images $240_i$ including the corresponding un-labeled input). The automatically-labeled second training inputs 320 are added to the first training inputs 120 and used to re-train the NN 110 (e.g., as described with respect to FIG. 1). In various implementations, the highly confident labeled images $240_i$ that become the second labeled training output 325 can be combined with (e.g., partially or completely) and/or replace the first labeled training inputs 125 (e.g., $I_{GT}$) in FIG. 1.

Figure 3:
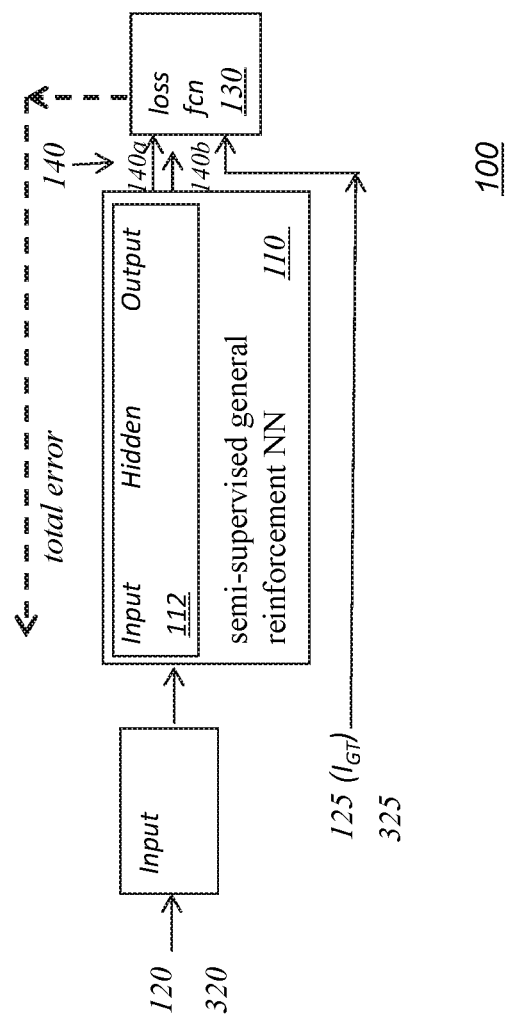
FIG. 3 is a block diagram of an example semi-supervised neural network environment.

In other words, in FIG. 3, the NN 110 is then re-trained (e.g., as described in FIG. 1) using the second training inputs 320 and corresponding second labeled training outputs 325 (e.g., confident automatically-labeled images $240_i$) in addition to the original first training inputs 120 and corresponding first labeled training outputs 125 (e.g., $I_{GT}$). FIG. 3 shows the second training of the semi-supervised learning of NN 110 using the confident self-labeled examples $240_n$. As shown in FIGS. 2-3, the second training portion of the semi-supervised learning for NN 110 can be repeated as often as desired and/or until a selected number of items are included in a final set of training inputs and corresponding final set of labeled training outputs.

Disadvantageously, use of the human identified loss function 130 (e.g., error function) in determining the second training inputs and corresponding second labeled training outputs deteriorates the quality of the training set. In various implementations, a NN 110 can not be successfully trained using the loss function 130.

In various method, system, and/or electronic device implementations, one or more second quality assurance NNs is used to determine a comparison metric or quality assurance function (e.g., non-linear or linear) for a first or base NN (e.g., NN 110). The one or more second quality assurance NNs can improve first stage training or second stage training for the first NN. In some implementations, the one or more second quality assurance NNs learns the comparison metric for the first NN concurrently with the first NN training. In some implementations, the one or more second quality assurance NNs increases a number of potential comparison metrics (e.g., types (e.g., non-linear) and/or implementations) that can be used. In various implementations, each of a plurality of second quality assurance NNs operate in parallel, and each of the plurality of second quality assurance NNs use different comparison metrics for the first NN. In some implementations, each of the one or more second quality assurance NNs operate in parallel, and learn different comparison metrics that in combination improve the second training stage for the first NN. In some implementations, a plurality of second quality assurance NN operating in parallel, learn different comparison metrics by inputting different random, prescribed, selected or modified versions or portions of first labeled training outputs 125 (e.g., $I_{GT}$), which can ensure their respective comparison metrics are different. Various method, system, and/or electronic device implementations provide multiple different quality assurance metrics for the first NN.

Figure 4:
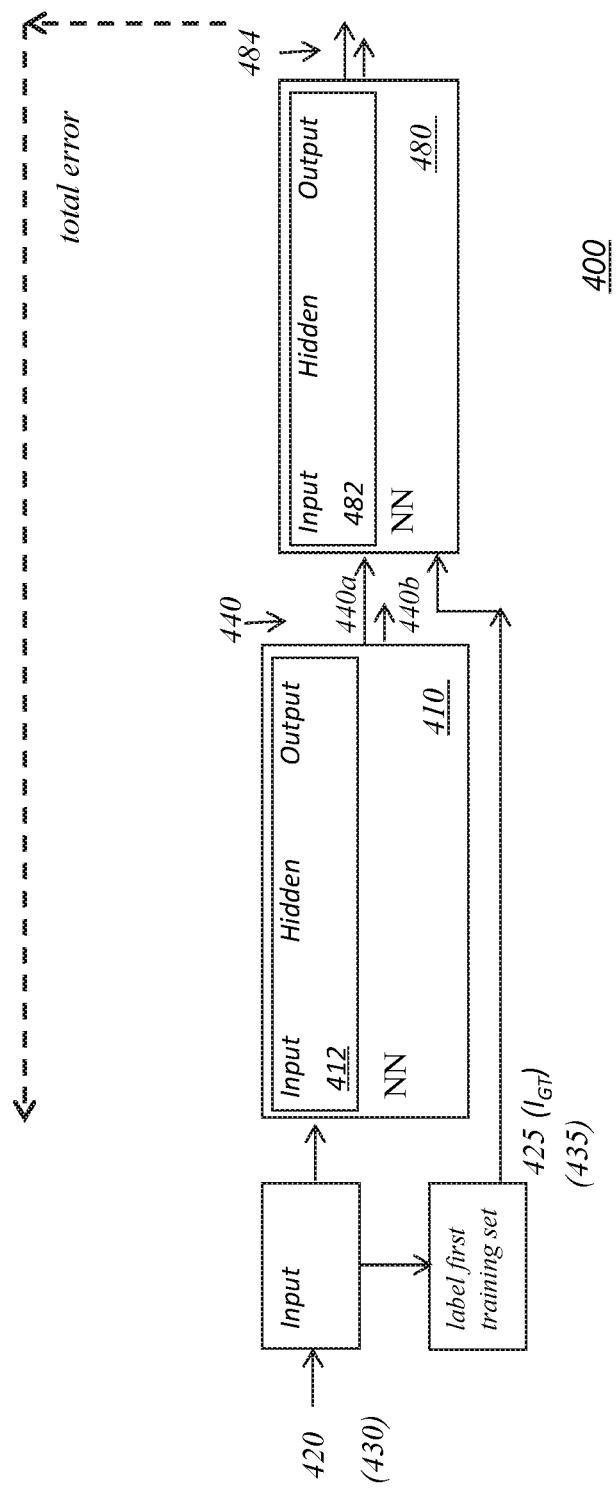
FIG. 4 is a block diagram of an example semi-supervised neural network environment in accordance with some implementations.

FIG. 4 is a diagram that shows iterative NN training for an example NN implementation. As shown in FIG. 4, an operation or task of a first NN 410 is identified.

In a first training stage for the system 400, first, weights 412 of the first NN 410 and weights 482 of a second NN 480 are initialized. Second, a small number of first example inputs or first training inputs 420 are human labeled for the identified NN task to become first labeled training outputs 425 (e.g., ground truth labeled outputs ($I_{GT}$) for the identified NN task. In some implementations, the ground truth data can be manually identified, semi-automatically determined, or automatically determined.

Third, the NN 410 undergoes supervised training using gradient descent based on the first training images 420, the IGT outputs 425, and the second NN 480 also uses the gradient descent to learn the comparison metric during the first training stage. In some implementations, gradient descent based on reducing or minimizing total error at an output 484 of the second NN 480, which is back propagated through the second NN 480 (e.g., working backward from the output layer weights, through the hidden layer weights, to the input layer weights) and then through an output 440 of the first NN 410 hierarchically through its layers to reduce or minimize total error at the respective outputs 484 and 440 of respective NNs 480 and 410. Output 440 of the NN 410 will include a NN 410 labeled output 440a and a confidence value 440b. In FIG. 4, gradient descent training can include full batch training, stochastic training or mini-batch training. Training the first NN 410 means reducing or minimizing the difference between the actual output 440 (e.g., prediction) and the target output, namely the first labeled training outputs 425 IGT. Training the second NN 480 results in a comparison metric that determines when the prediction output by NN 410 is good (or bad). The difference at the output 484 of the second NN 480 is the total error and is set by the comparison metric. In some implementations, the output 484 includes a measure of the accuracy of the first NN 410

As described herein (see blocks 740, 750, 760, 770), a set of second training inputs and confident, automatically-labeled second training outputs can be used to further train the first NN 410 and the second NN 480 of the system 400. However, a second training set (e.g., highly confident labeled outputs) are selected from the real world inputs having the highest confidence values determined by the second NN 480 or based on an output of the second NN 480.

To generate additional training data for the system 400, a set of real-world inputs (e.g., a million or a billion unlabeled images) are input into the NN 410 after completion of the first training stage. The first NN 410 receives each real world input item and generates a corresponding labeled output item, and the second NN 480 receives both the real world input item and the corresponding labeled output item to generate a output and a confidence value (e.g., 484) for the accuracy of the corresponding labeled output item generated by the first NN 410. When the entire set of real-world inputs are passed through the first NN 410 and the second NN 480, a subset (e.g., 10, 20, 100, or 1000) of the input items and the corresponding labeled output items having the highest confidence values determined by the second NN 480 become an automatically-labeled or second training set including unlabeled second training input 430 and second labeled training output 435. The second training set (e.g., highly confident labeled outputs) are added to the first training set (the first training images 420 and the first labeled training outputs 425) and used to in a further second stage of training for the first NN and the second NN 480 (e.g., see FIG. 3). In some implementations, the labeled training set grows with each iteration.

In various implementations, a plurality of second NNs (e.g., 5, 10, 20, 50) are connected in parallel at the output of the first NN, and each of the plurality of second NNs generate different comparative metrics or quality assurance functions for use with the first NN. In some implementations, a training capability can increase with additional second NNs. In some implementations, the training of the plurality of second NNs occurs at the same time as the training of the first NN. In some implementations, different, independent comparative metrics are generated at the plurality of second NNs by setting different initialization conditions (e.g., weights different from one another). In some implementations, different, independent comparative metrics are generated at the plurality of second NNs by inputting different random, prescribed, selected or modified versions or portions of first labeled training outputs (e.g., $I_{GT}$). In various implementations, outputs of the second NNs (e.g., confidence value(s)) are used to select the confident automatically labeled training inputs of the first NN.

Figure 5:
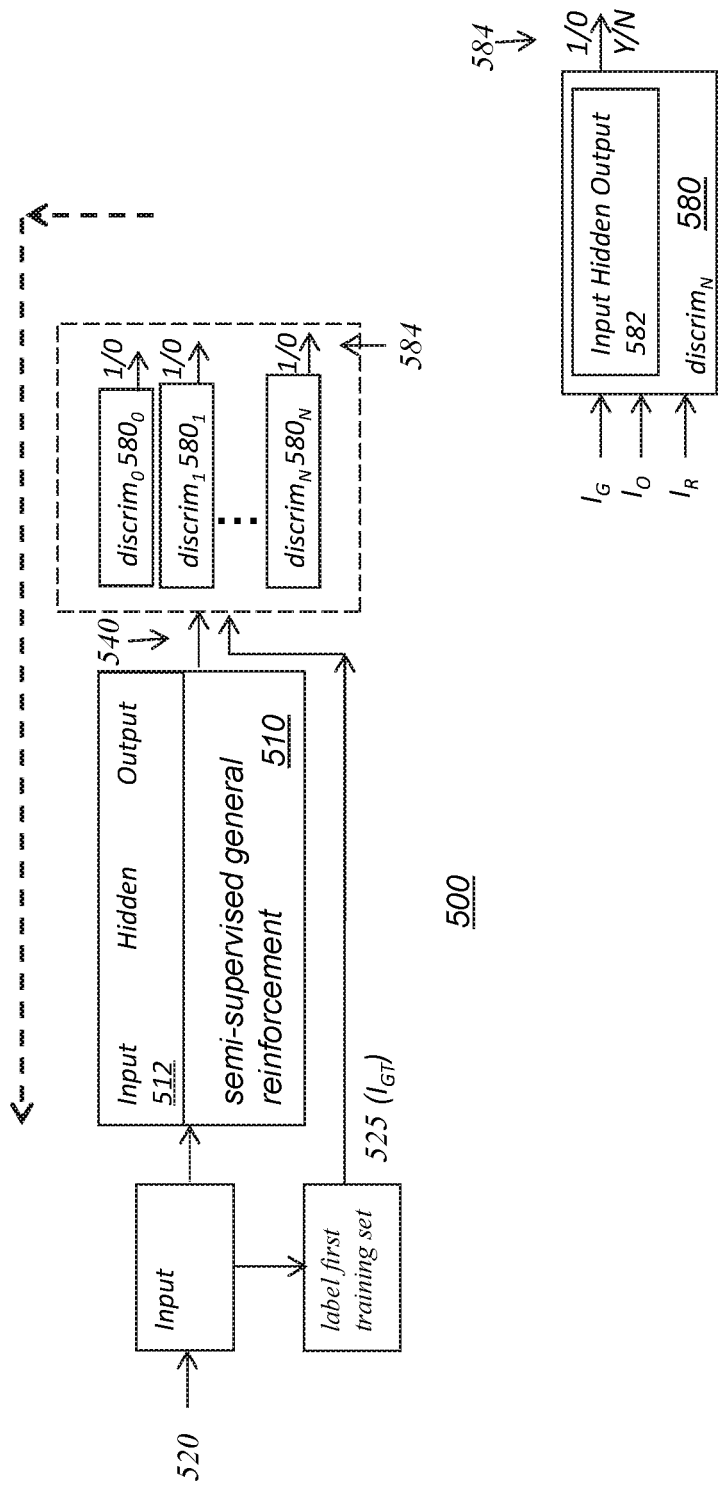
FIG. 5 is a block diagram of an example semi-supervised neural network training environment in accordance with some implementations.

FIG. 5 is a block diagram of an example semi-supervised NN training environment in accordance with some implementations. As shown in FIG. 5, a system 500 includes a plurality of second quality assurance NNs $580_0$, $580_1$, $580_2$, ..., $580_N$ connected in parallel at the output of the first NN 510. In various implementations, each of the second quality assurance NNs 580 determines different comparative metrics for use with the single first NN 510. In some implementations, each of the plurality of second quality assurance NNs 580 uses different initialization values (e.g., different initialization weights) to generate the different comparative metrics for the single first NN 510.

In various implementations, second quality assurance NNs $580_1$, $580_2$, ..., $580_N$ are discriminatory NNs. As shown in FIG. 5, inputs to a discriminatory NN 580 include (i) the input item (e.g., image), (ii) ground truth $I_{GT}$ for the input item (e.g., the corresponding labels of the input image), and (iii) the output labeled item from a NN to be trained (e.g., first NN 510). In some implementations, the output 584 of each second discriminatory NN 580 is a binary value such as 1 or 0; or yes/no. In various implementations, combined outputs (e.g., weighted) of the second NNs $580_1$-$580_N$ (e.g., confidence value(s)) select the confident automatically labeled training outputs to be used as additional training data for the first NN 510 (e.g., and second NNs) during additional second training(s).

In a first training stage of semi-supervised learning for the system 500, first, weights 512 of the first NN 510 and weights 582 of each of the plurality of second quality assurance NNs $580_1$, $580_2$, ..., $580_N$ are initialized. The initialized weights 582 of each of the plurality of second quality assurance NNs $580_1$, $580_2$, ..., $580_N$ are different. Second, a small number of first training inputs 520 are human labeled for the identified NN task of the first NN 510 to generate first labeled training outputs 525 (e.g., ground truth ($I_{GT}$)). Third, the first NN 510 and the plurality of second NNs $580_1$, $580_2$, ..., $580_N$ are first trained using the first training inputs 520 and ground truth set of the first labeled training outputs 525. In some implementations, ground truth training uses gradient descent to reduce or minimize total error (e.g., system 500 error) at the output of each of the second quality assurance NNs $580_1$, $580_2$, ..., $580_N$, which is back propagated through each corresponding second NN and then all contribute to adjusting the weights of the first NN 510 to reduce or minimize total error at the first NN output 540. Training the first NN 510 means reducing or minimizing the difference between the actual output 540 (e.g., prediction) and the target output, $I_{GT}$, which is the first labeled training outputs 525. The second quality assurance NNs $580_1$, $580_2$, ..., $580_N$ are trained to determine whether the prediction output by NN 510 is good (or bad).

In various implementations, one or more of the plurality of second NNs $580_1$, $580_2$, ..., $580_N$ can be pre-trained. Pre-training the plurality of second NNs $580_1$, $580_2$, ..., $580_N$ occurs before the semi-supervised learning (e.g., block 710) for the system 500 (e.g., before the weights 512 of the first NN 510 are initialized). In some implementations, the plurality of second NNs $580_1$, $580_2$, ..., $580_N$ can be pre-trained using the first labeled training outputs 525 and some incorrect inputs (e.g., random garbage images). In pre-training, an output of the plurality of second NNs $580_1$, $580_2$, ..., $580_N$ should be 1/YES for the first labeled training outputs 525 and 0/NO for the incorrect inputs. In various implementations, pre-training provides improved initialization for the plurality of second NNs $580_1$, $580_2$, ..., $580_N$ before the semi-supervised learning begins.

As described herein (see FIG. 4 (430, 435) or blocks, 740, 750, 760, 770), a set of confident automatically labeled training inputs can also be used to further train the first NN 510 and the second quality assurance NNs $580_1$, $580_2$, ..., $580_N$ of the system 500. In various implementations, the confidence value(s) used to select the confident automatically labeled training inputs is based on combined outputs (e.g., selected or weighted) of the second quality assurance NNs $580_1$-$580_N$. In some implementations, each of the second quality assurance NNs $580_1$-$580_N$ outputs a YES (1 or first value) when deciding a first NN 510 labeled output 540 for a real world input item is accurate and a NO (0 or second value) when deciding the output 540 is not accurate. Then, a confident automatically labeled training inputs is selected when the number of first values from the second quality assurance NNs $580_1$-$580_N$ is over a threshold, e.g., >50%, >80%, >95% or equals 100%. In some implementations, outputs of the plurality of second quality assurance NNs $580_1$-$580_N$ are weighted differently and a weighted combination of first values is compared to a threshold (e.g., scalar value). In some implementations, a small number of inputs (e.g., 5, 10, 50, etc.) yielding the highest combined confidence using the combination of first values output by the second quality assurance NNs $580_1$-$580_N$ are selected. In various implementations, the combined confidence values used to select the confident automatically labeled training inputs include a subset of the second quality assurance NNs $580_1$-$580_N$.

Figure 6:
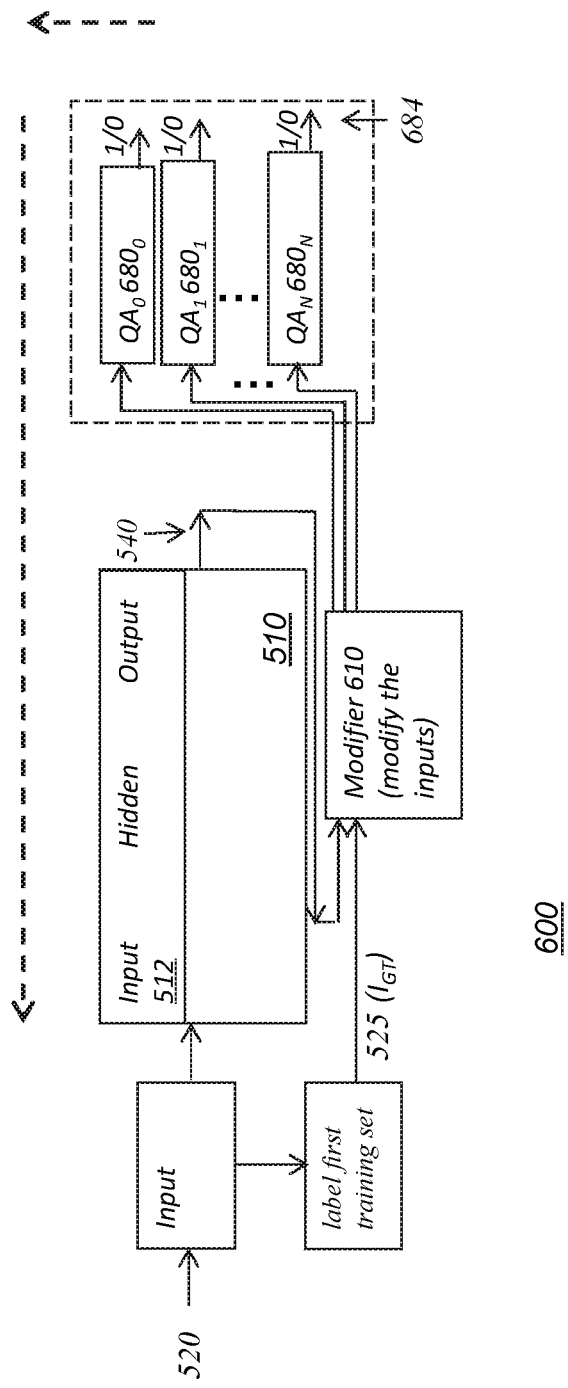
FIG. 6 is a block diagram of an example semi-supervised neural network training environment in accordance with some implementations.

FIG. 6 is a block second quality assurance NNs $680_0$-$680_N$ of an example semi-supervised NN training environment in accordance with some implementations. As shown in FIG. 6, a system 600 includes a plurality of second quality assurance NNs $680_1$, $680_2$, ..., $680_N$ to determine different comparative metrics connected in parallel at the output of the first NN 510 and coupled to a modifier 610. In various implementations, modifier 610 inputs a labeled training output (e.g., 525) and outputs a different version to each of the plurality of second quality assurance NNs $680_1$, $680_2$, ..., $680_N$ to ensure their respective comparative metrics are different. The system 600 operates similarly to the system 500 in that each second quality assurance NN 680 adjusts its w684eights during training to determine a comparison metric that accurately trains first NN 510 in its assigned task. In various implementations, one or more of the plurality of second quality assurance NNs $680_1$-$680_N$ can be pre-trained. Further, in various implementations, combined outputs (e.g., weighted) of the second quality assurance NNs $680_1$-$680_N$ (e.g., confidence value(s)) select the confident automatically labeled training inputs of the first NN 510 during second training. In some implementations, an output 684 of each the plurality of second quality assurance NNs 680 is a binary value such as 1 or 0; or yes/no.

As shown in FIG. 6, in various implementations, each of the plurality of second quality assurance NNs 680 uses different versions, modifications or portions (alone or in combination) of the first labeled training outputs 525 (e.g., ground truth ($I_{GT}$)) received from the modifier 610 as inputs to ensure different comparative metrics for the single first NN 510. In some implementations, each of the second quality assurance NNs 680 uses different portions of the first labeled training outputs 525 and corresponding different portions of the output 540 as respective inputs to generate different comparative metrics for the first NN 510.

A first training stage and a second training stage of semi-supervised learning for the system 600 is similar to the system 500, but in various implementations, the system 600 uses the modifier 610 to modify the labeled training outputs (e.g., first labeled training outputs 525) and first NN labelled outputs (e.g., first NN 510 labeled output 540) for the second quality assurance NNs $680_1$, $680_2$, ..., $680_N$. In some implementations, the modifier 610 selects a different physical portion of the first labeled training outputs 525 and the labeled output 540 such as the entire input, a first half (e.g., top, left side) of the input, a second half (e.g., bottom, right side) of the input, respective quarters of the input, user designated areas of the input, etc. so each of the second quality assurance NNs $680_1$, $680_2$, ..., $680_N$ receives a different part of the first labeled training outputs 525 and the outputs 540 as its input. In some implementations, the modifier 610 selects a different content portion of the first labeled training outputs 525 and the labeled output 540. For example, if the first NN was determining a human body pose, a different content portion of the first labeled training outputs 525 and the labeled output 540 such as the entire body pose (input), a right or left leg, right or left arm, torso, torso and arms, torso and legs, head, head and torso, etc. so each of the second quality assurance NNs $680_1$, $680_2$, ..., $680_N$ receives different content part of the first labeled training outputs 525 as an input. In this manner, the second quality assurance NNs $680_1$, $680_2$, ..., $680_N$ can learn which poses the human body is capable of making and which poses are not possible (e.g., joint orientations and range of motions, such as elbows and knees (single direction) and wrist or neck (multiple directions, ranges of motion). In some implementations, an output of the second quality assurance NNs $680_1$, $680_2$, ..., $680_N$ (e.g., confidence) can be weighted in a prescribed relationship to respective operations of the modifier 610.

In some implementations, the modifier 610 selects a different random portion of the first labeled training outputs 525 and the labeled output 540. In some implementations, the modifier 610 selects one or more different modifications (e.g., transformation, warp, 2D/3D, decimation, parameterization, etc.) of all or part of the first labeled training outputs 525 and the labeled output 540.

In some implementations, the modifier 610 associates a pair of images for at least one of the second quality assurance NNs $680_1$, $680_2$, ..., $680_N$ by providing two inputs, namely the modified portion of the first labeled training outputs 525 and the labeled output 540, and a "paired" different image from the first labeled training outputs 525. In one implementation, the paired image can be undergo modification.

In various implementations, one or more of the plurality of second quality assurance NNs $680_1$-$680_N$ can be pre-trained. In some implementations, the first training inputs 520 and some incorrect inputs are input to the modifier 610, and then, the modified first training inputs 520 and the modified incorrect inputs are input to the plurality of second NNs $580_1$, $580_2$, ..., $580_N$ during pre-training. In pre-training, an output of the plurality of second quality assurance NNs $680_1$-$680_N$ should be 1/YES for the modified first training inputs 520 and 0/NO for the modified incorrect inputs.

Figure 7:
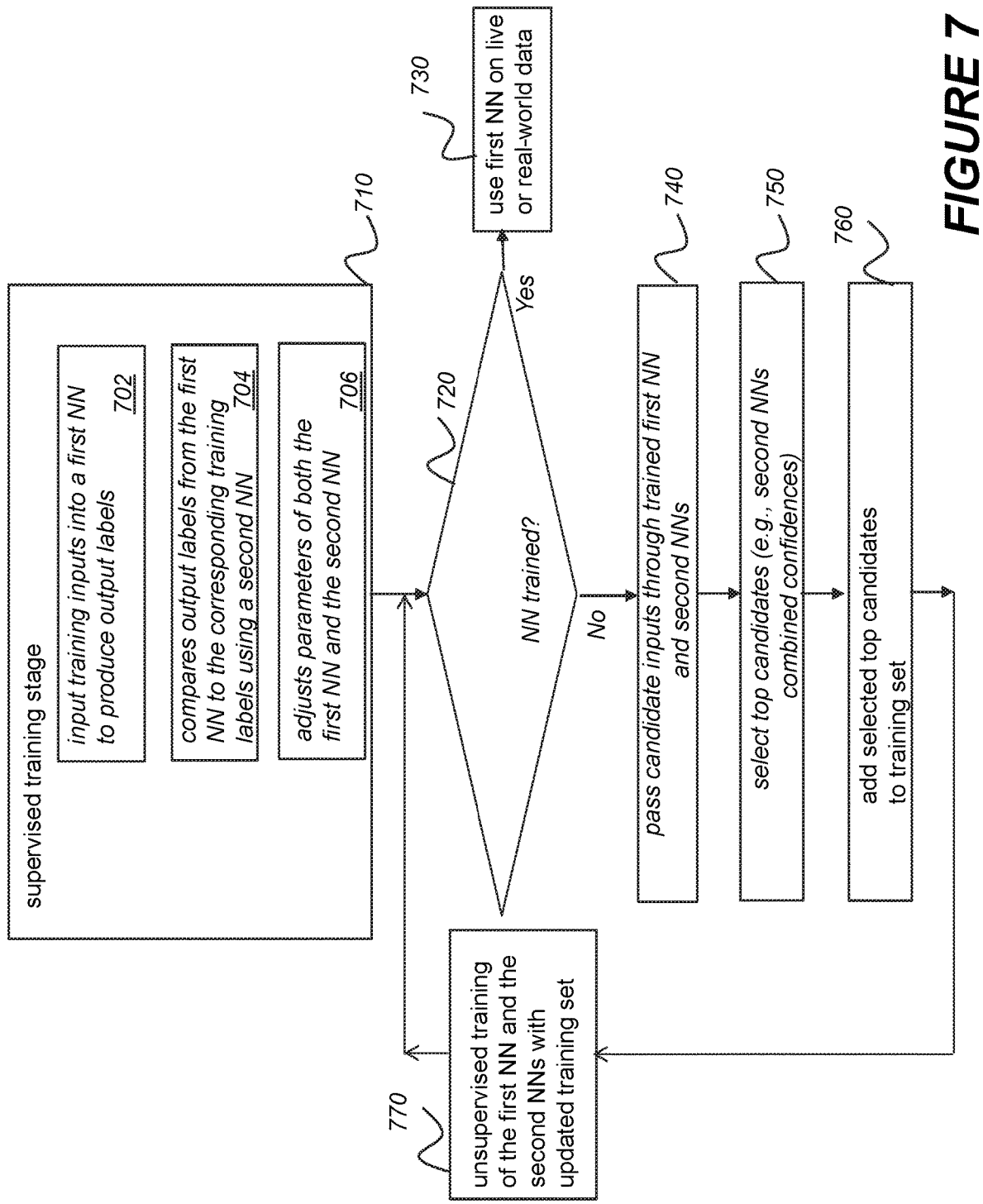
FIG. 7 is a flowchart representation of a method of training at least a first neural network in accordance with some implementations.

FIG. 7 is a flowchart representation of a method of operating an electronic device in accordance with some implementations. In various implementations, an example method is performed by processing logic, including hardware, firmware, software, or a combination thereof. In some implementations, an example method is performed by a processor executing code stored in a non-transitory computer-readable medium (e.g., a memory). In some implementations, an example method is performed on a portable electronic device (e.g., laptop, tablet, smartphone, head-mounted display (HMD).

At block 710, the method 700 implements a first training stage of a first NN through an initial training using a first training set of data including training items and corresponding training labels (e.g., training the first NN with ground truth data). For example, when the NN input is images, the first NN might be trained to identify and label objects in subsequently received images. At block 710, in various implementations, initially training the first NN includes block 702, block 704, and block 706. At block 702, the method 700 inputs first training items (e.g., 520) into the first NN to produce processed outputs with labels (e.g., 540). At block 704, the method compares the labeled outputs (e.g., 540) from the first NN to the corresponding human labeled ground truth (e.g., 525) for the identified NN task of the first NN using a plurality of second quality assurance NNs that each apply a learned comparison metric (e.g., the second quality assurance NN-based comparison metrics replace the conventional loss function). At block 706, the method 700 adjusts the parameters (e.g., output weights, hidden layer weights, and input layer weights) of both the first NN and the second quality assurance NNs based on a total error determined at an output (e.g., 580) of each second quality assurance NN for at least one of the first training items input to the first NN and a corresponding first labeled training output that is input to the second quality assurance NNs (e.g., as determined by the learned comparison metrics). In various implementations, the parameters are adjusted through gradient descent weight adjustments based on the comparison. Thus, at block 710 the first NN is learning its operation (e.g., prediction, etc.) and the second quality assurance NNs learn comparison metrics.

At block 720, the method determines whether the first NN is sufficiently trained. When the determination in block 720 is affirmative, control passes from training in the method 700 to using the first NN in the method. At block 730, the first NN is ready to be used. At block 730, the method uses the first NN for its intended purpose on live or real world data. In some implementations, the method uses the first NN for prediction, forecasting, classification, pattern recognition, or the like at block 770. When the determination in block 720 is negative, control continues to block 740.

At block 740, the method inputs additional items (e.g., a million real-world inputs, such as images) into the first NN to produce additional labeled outputs of the real-world input for evaluation by the second quality assurance NNs (e.g., second NNs $580_1$, $580_2$, ..., $580_N$). The second quality assurance NNs output corresponding confidence values for each of the real-world input item/labeled output pairs.

At block 750, the method 700 selects, based on the confidence values of the second quality assurance NNs (e.g., high confidence values), a subset of the block 740 additional inputs and corresponding additional labeled outputs to be an automatically-labeled second training set of data for the first NN and second quality assurance NNs. In some implementations, at block 750, a best or most confident 100 of the block 740 additional inputs (e.g., the 100 highest confidence values) become the second training set including second training items and corresponding second labeled training outputs (e.g., automatically-labeled).

At block 760, the method combines the second training set (e.g., automatically-labeled) with the first training set including the first training inputs 520 and the first labeled training outputs 525 (e.g., block 702). In various implementations, current second training items and corresponding second labeled training outputs are added to or replace in whole or in part the first training inputs and the first labeled training outputs. In some implementations, the current second training items and corresponding second labeled training outputs replace only previous automatically-labeled training set or sets because the first training inputs 520 and the first labeled training outputs 525 is correct and should always be used for training.

At block 770, the method performs second training (e.g., unsupervised) on the first NN and the second NNs with the updated training set of data. Thus, at block 770, the method inputs the updated training set of data and corresponding labels into the first NN to produce outputs with corresponding labels, and compares the outputs and corresponding labels from the first NN to the updated training set of data and corresponding labels using the second NNs and their respective comparison metrics. At block 770, the method 700 adjusts the parameters (e.g., weights) of both the first NN and the second NN based on the comparison. In various implementations, the parameters are adjusted through gradient descent weight adjustments based on the comparison. In some implementations, at block 770, the method concurrently re-trains (during a second learning stage) the first NN and the second NNs using an updated or combined training set of data. In some implementations, performance of 1) updating comparison metric learned by the second neural network and 2) re-training the first NN during the second learning stage are overlapping in time.

A reliable and practical measure of prediction "confidence" is essential in real-world tasks. Neural network predictions suffer uncertainty due to (a) inaccuracies in the training data and (b) the limitations of the model. With respect to (a), the training set is typically noisy and incomplete (e.g., not all possible input-output examples are available). Noise is inherent to all real data and contributes to the total prediction variance. With respect to (b), because the gradient descent algorithm can only "use" the information available in the training set, the solution is likely to be valid only for regions sufficiently represented by the training data. Example confidence measures include but are not limited to maximum likelihood, approximate Bayesian and bootstrap, which can address both noise inherent to the data and model uncertainty.

In various implementations, a NN is used to perform selected tasks. In some implementations, operations of some NN implementations include prediction, forecasting, classification, pattern recognition or general reinforcement learning. In some implementations, NN implementations include feed-forward or feedback implementations. In some implementations, NNs include a multi-stage NN. In some implementations, types of NNs include Radial basis function NNs, Kohonen Self Organizing NNs, Recurrent NNs, Convolutional NNs, Modular NNs and the like.

In various implementations, input data to NNs can include images of high or low resolution. In some implementations, NNs can be configured to use event camera data, shutter-based camera data, or a combination of the two types of data. In some implementations, input data is numerical or converted to numerical data. For example, sound is converted to numbers that represent amplitude over time where 0 is silence and 1 is loud. For example, images are converted to greyscale measured on a scale from 0 is black and 1 is white. For example, male/female can be converted to 0/1.

Figure 8:
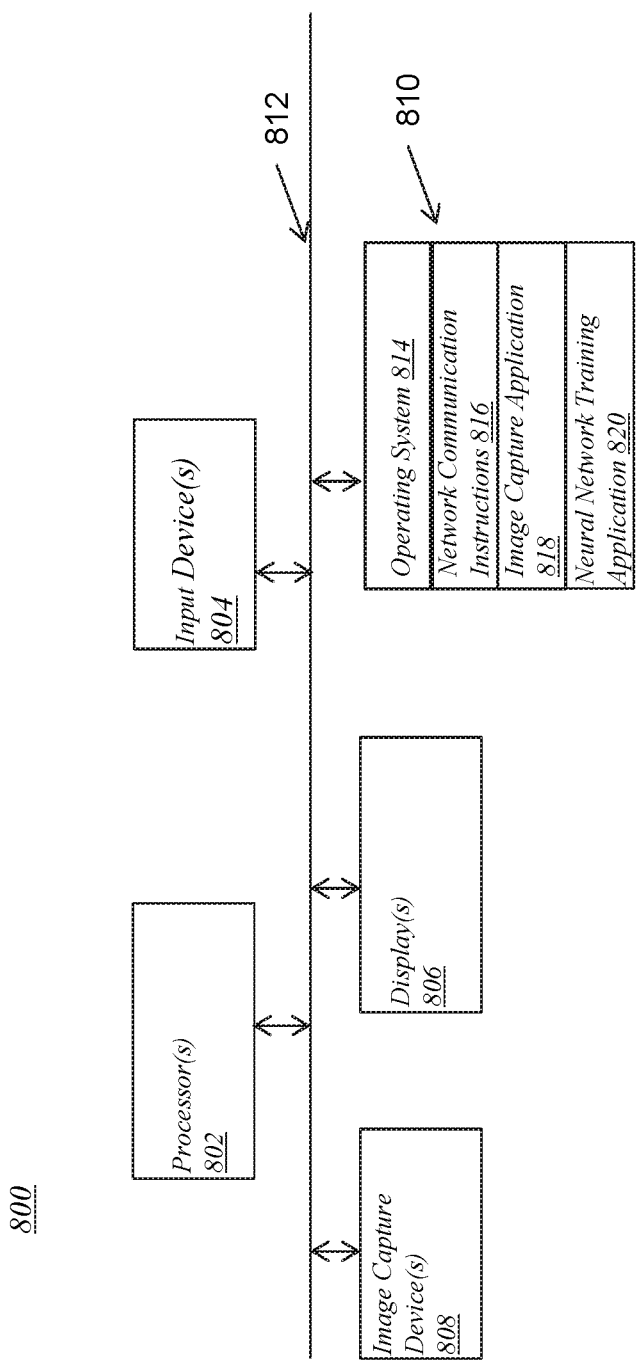
FIG. 8 is a block diagram of an example system architecture implementing neural network training applications.

FIG. 8 is a block diagram of an example system architecture implementing the NN training applications according to FIGS. 4-7. The architecture 800 can be implemented on any electronic device that runs software applications derived from compiled instructions, including without limitation personal computers, servers, smart phones, media players, electronic tablets, game consoles, digital cameras, video cameras, email devices, etc. In some implementations, the architecture 800 can include one or more processors 802, one or more input devices 804, one or more display devices 806, image capture device 808, and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but are not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire. Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.).

Computer-readable medium 810 can include various instructions 814 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 can establish and maintain network connections (e.g., software for implementing communication protocols, such as TCP/IP, HTTP, Ethernet, etc.).

An image capture application 818 can include instructions that operate the image capture device 808. The image capture device 808 can be an embedded device or a separate device coupled to system architecture 800 through a port (e.g., USB, FireWire).

Neural Network training application 820 can be an application that implements the training and later use of NNs and processes described in reference to FIGS. 4-6. The NN training application 820 can also be implemented as part of operating system 814.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

Moreover, FIG. 8 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   at an electronic device with one or more processors:
     during a first training stage, initially training a first neural network using a training set of data comprising training inputs and corresponding training labels, wherein initially training the first neural network comprises:
       inputting the training inputs into the first neural network to produce output labels;
       determining value, a total error and a corresponding confidence value at each output of each of a plurality of second neural networks connected to an output of the first neural network, each of the plurality of second neural networks comparing the output labels to the corresponding training labels using a different comparison metric of a plurality of comparison metrics, the confidence values each corresponding to accuracy of the output labels with respect to each of the plurality of comparison metrics; and adjusting parameters of each of the plurality of second neural networks to reduce the total error at each output of each of the plurality of second neural networks resulting in adjustment of the plurality of comparison metrics applied by each of the plurality of second neural networks to reduce a total error at the output of the first neural network;

during a second training stage:
inputting additional inputs into the first neural network to produce additional output labels;

evaluating, by the plurality of second neural networks, the additional output labels to produce corresponding confidence values corresponding to an accuracy of the additional output labels with respect to each of the plurality of comparison metrics;

selecting, from the training set of data based on the confidence values, an automatically-labeled training set of data generated in response to said inputting said additional inputs, wherein said automatically-labeled training set of data comprises a subset of the additional inputs and a corresponding subset of the additional output labels; and further training the first neural network using the automatically-labeled training set of data.

2. The method of claim 1, wherein the further training comprises concurrently re-training the first neural network and one of the plurality of second neural networks using the automatically-labeled training set of data during the second training stage.

3. The method of claim 1, wherein the plurality of second neural networks are connected in parallel at the output of the first neural network, and wherein said comparing the output labels to the corresponding training labels comprises each of the plurality of second neural networks respectively generating each of the plurality of comparison metrics by comparing the output labels to:

different random or pre-determined portions of the corresponding training labels;

differently modified versions of the corresponding training labels; or different variations of the corresponding training labels.

4. The method of claim 3, wherein the plurality of second neural networks use different initialization values to generate each said different comparison metric of the plurality of comparison metrics.

5. The method of claim 3, further comprising:
inputting second inputs into the first neural network to produce second output labels;

inputting the second output labels and differently modified versions of the second inputs into said each of the plurality of second neural networks to output second confidence values;

generating, based on a combination of the second confidence values, a second automatically-labeled training set of data comprising a subset of the second inputs and a corresponding subset of the second output labels; and further training, during the second training stage, the first neural network using the second automatically-labeled training set of data.

6. The method of claim 5, wherein the generating, based on the combination of the second confidence values, comprises adding individual confidence values or comparing a weighted combination of individual confidence values to a threshold.

7. The method of claim 1, wherein operations of the first neural network operations include hand or body tracking, semantic segmentation, dense depth estimation, gaze tracking, or general reinforcement learning.

8. The method of claim 1, wherein performance of 1) the adjusting the comparison metric applied by one of the second plurality of neural networks and 2) re-training the first neural network during the second training stage are overlapping in time.

9. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:

during a first training stage, initially training a first neural network using a training set of data comprising training inputs and corresponding training labels, wherein initially training the first neural network comprises:

inputting the training inputs into the first neural network to produce output labels;

determining a total error and a corresponding confidence value at each output of each of a plurality of second neural networks connected to an output of the first neural network, each of the plurality of second neural networks comparing the output labels to the corresponding training labels using a different comparison metric of a plurality of comparison metrics, the confidence values each corresponding to accuracy of the output labels with respect to each of the plurality of comparison metrics; and adjusting parameters of each of the plurality of second neural networks to reduce the total error at each output of each of the plurality of second neural networks, resulting in adjustment of the plurality of comparison metrics applied by each of the plurality of second neural networks to reduce a total error at the output of the first neural network;

during a second training stage:
inputting additional inputs into the first neural network to produce additional output labels;

evaluating, by the plurality of second neural networks, the additional output labels to produce corresponding confidence values corresponding to an accuracy of the additional output labels with respect to each of the plurality of comparison metrics;

selecting, from the training set of data based on the confidence values, an automatically-labeled training set of data generated in response to said inputting said additional inputs, wherein said automatically-labeled training set of data comprises a subset of the additional inputs and a corresponding subset of the additional output labels; and further training the first neural network using the automatically-labeled training set of data.

10. The system of claim 9, wherein the further training comprises concurrently re-training the first neural network and one of the plurality of second neural networks using the automatically-labeled training set of data and corresponding labels during the second training stage.

11. The system of claim 9, wherein the plurality of second neural networks are connected in parallel at the output of the first neural network, and wherein said comparing the output labels to the corresponding training labels comprises each of the plurality of second neural networks respectively generating each of the plurality of comparison metrics by comparing the output labels to:
- different random or pre-determined portions of the corresponding training labels;
- differently modified versions of the corresponding training labels; or
- different variations of the corresponding training labels.

12. The system of claim 11, wherein the plurality of second neural networks use different initialization values to generate each said different comparison metric of the plurality of comparison metrics.

13. The system of claim 11, further comprising:
inputting second inputs into the first neural network to produce second output labels;
inputting the second output labels and differently modified versions of the second inputs into said each of the plurality of second neural networks to output second confidence values;
generating, based on a combination of the second confidence values, a second automatically-labeled training set of data comprising a subset of the second inputs and a corresponding subset of the second output labels; and
further training, during the second training stage, the first neural network using the second automatically-labeled training set of data.

14. The system of claim 13, wherein the generating, based on the combination of the second confidence values, comprises adding individual confidence values or comparing a weighted combination of individual confidence values to a threshold.

15. The system of claim 9, wherein performance of 1) the adjusting the comparison metric applied by one of the second plurality of neural networks and 2) re-training the first neural network during the second training stage are overlapping in time.

16. The system of claim 9, wherein operations of the first neural network operations include hand or body tracking, semantic segmentation, dense depth estimation, gaze tracking, or general reinforcement learning.

17. A non-transitory computer-readable storage medium, storing program instructions computer-executable on a computer to perform operations comprising:
during a first training stage, initially training a first neural network using a training set of data comprising training inputs and corresponding training labels, wherein initially training the first neural network comprises:
inputting the training inputs into the first neural network to produce output labels;
determining a total error and a corresponding confidence value at each output of each of a plurality of second neural networks connected to an output of the first neural network, each of the plurality of second neural networks comparing the output labels to the corresponding training labels using a different comparison metric of a plurality of comparison metrics, the confidence values each corresponding to accuracy of the output labels with respect to each of the plurality of comparison metrics; and
adjusting parameters of each of the plurality of second neural networks to reduce the total error at each output of each of the plurality of second neural networks, resulting in adjustment of the plurality of comparison metrics applied by each of the plurality of second neural networks to reduce a total error at the output of the first neural network;
during a second training stage:
inputting additional inputs into the first neural network to produce additional output labels;
evaluating, by the plurality of second neural networks, the additional output labels to produce corresponding confidence values corresponding to an accuracy of the additional output labels with respect to each of the plurality of comparison metrics;
selecting, from the training set of data based on the confidence values, an automatically-labeled training set of data generated in response to said inputting said additional inputs, wherein said automatically-labeled training set of data comprises a subset of the additional inputs and a corresponding subset of the additional output labels; and
further training the first neural network using the automatically-labeled training set of data.

18. The non-transitory computer-readable storage medium of claim 17, wherein the further training comprises concurrently re-training the first neural network and one of the plurality of second neural networks using the automatically-labeled training set of data during the second training stage.

* * * * *

UNITED STATES PATENT AND TRADEMARK OFFICE
CERTIFICATE OF CORRECTION

| | |
|---|---|
| PATENT NO. | : 12,033,058 B1 |
| APPLICATION NO. | : 16/421606 |
| DATED | : July 9, 2024 |
| INVENTOR(S) | : Peter Meier and Tanmay Batra |

It is certified that error appears in the above-identified patent and that said Letters Patent is hereby corrected as shown below:

In the Claims

Column 14, Line 63 reads:
"...claim 1, determining value, a total error..."
Should read:
--...claim 1, determining a total error...--

Column 16, Line 42 reads:
"...claim 9, networks, resulting in adjustments..."
Should read:
--...claim 9, networks resulting in adjustments...--

Column 18, Line 20 reads:
"...claim 17, networks, resulting in adjustments..."
Should read:
--...claim 17, networks resulting in adjustments...--

Signed and Sealed this
Thirteenth Day of August, 2024

Katherine Kelly Vidal
*Director of the United States Patent and Trademark Office*